(12) United States Patent
Jiang et al.

(10) Patent No.: US 10,496,698 B2
(45) Date of Patent: Dec. 3, 2019

(54) METHOD AND SYSTEM FOR DETERMINING IMAGE-BASED CONTENT STYLES

(71) Applicant: Baidu USA LLC, Sunnyvale, CA (US)

(72) Inventors: Yifei Jiang, Sunnyvale, CA (US); Dong Li, Sunnyvale, CA (US); Zhuang Li, Sunnyvale, CA (US); Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 435 days.

(21) Appl. No.: 15/246,156

(22) Filed: Aug. 24, 2016

(65) Prior Publication Data
US 2018/0060357 A1 Mar. 1, 2018

(51) Int. Cl.
| | |
|---|---|
| G06F 17/30 | (2006.01) |
| G06F 16/58 | (2019.01) |
| G06F 16/51 | (2019.01) |
| G06F 16/583 | (2019.01) |
| G06F 17/21 | (2006.01) |
| G06F 17/27 | (2006.01) |
| G06F 17/24 | (2006.01) |

(52) U.S. Cl.
CPC .......... *G06F 16/5866* (2019.01); *G06F 16/51* (2019.01); *G06F 16/5838* (2019.01); *G06F 16/5846* (2019.01); *G06F 16/5854* (2019.01); *G06F 17/212* (2013.01); *G06F 17/218* (2013.01); *G06F 17/241* (2013.01); *G06F 17/248* (2013.01); *G06F 17/2775* (2013.01)

(58) Field of Classification Search
CPC .......... G06F 17/30268; G06F 16/5866; G06F 16/5838; G06F 16/5854
See application file for complete search history.

(56) References Cited

U.S. PATENT DOCUMENTS

| | | | | |
|---|---|---|---|---|
| 6,834,371 B1* | 12/2004 | Jensen | ............. | G06F 17/30017 |
| | | | | 707/E17.009 |
| 2008/0133505 A1* | 6/2008 | Bayley | ............. | G06F 17/30716 |
| 2009/0199230 A1* | 8/2009 | Kumar | ................... | G06Q 30/02 |
| | | | | 725/32 |
| 2011/0072048 A1* | 3/2011 | Hua | .................. | G06F 17/30265 |
| | | | | 707/780 |
| 2011/0270828 A1* | 11/2011 | Varma | .............. | G06F 17/30864 |
| | | | | 707/728 |

* cited by examiner

*Primary Examiner* — Syed H Hasan
(74) *Attorney, Agent, or Firm* — Womble Bond Dickinson (US) LLP

(57) ABSTRACT

According to one embodiment, in response to a content description describing a content item, an analysis is performed on the content description. An image having image content is identified that is related to the content description based on the analysis. One or more phrases are derived from the content description based on the analysis, the one or more phrases summarizing the content description. A list of content styles is determined based on a relationship between the image and the one or more phrases. A composite content item having the image and the one or more phrases therein is generated based on a selected content style selected from the list of content styles. The image and the one or more phrases are arranged according to a layout corresponding to the selected content style.

18 Claims, 10 Drawing Sheets

| Keyword(s) | Image Identifier(s) |
|---|---|
| Flower | Image 1, Image 2, Image 3, Image 4, Image 5 |
| Beijing Flower | Image 1 |
| Shanghai Flower | Image 2 |
| Flower Delivery | Image 1, Image 2, Image 4 |
| 301 ... | 302 ... |

FIG. 3

METHOD AND SYSTEM FOR DETERMINING IMAGE-BASED CONTENT STYLES

TECHNICAL FIELD

Embodiments of the present invention relate generally to searching content. More particularly, embodiments of the invention relate to determining content style for matching images with content in response to a search query.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items. It is equally challenge to arrange a content item and the associated image in an appropriate style that is most appealing to users.

BRIEF DESCRIPTION OF THE DRAWINGS

Embodiments of the invention are illustrated by way of example and not limitation in the figures of the accompanying drawings in which like references indicate similar elements.

FIG. 3 is an example of a keyword-image matching table according to one embodiment of the invention.

DETAILED DESCRIPTION

Figure 1A:
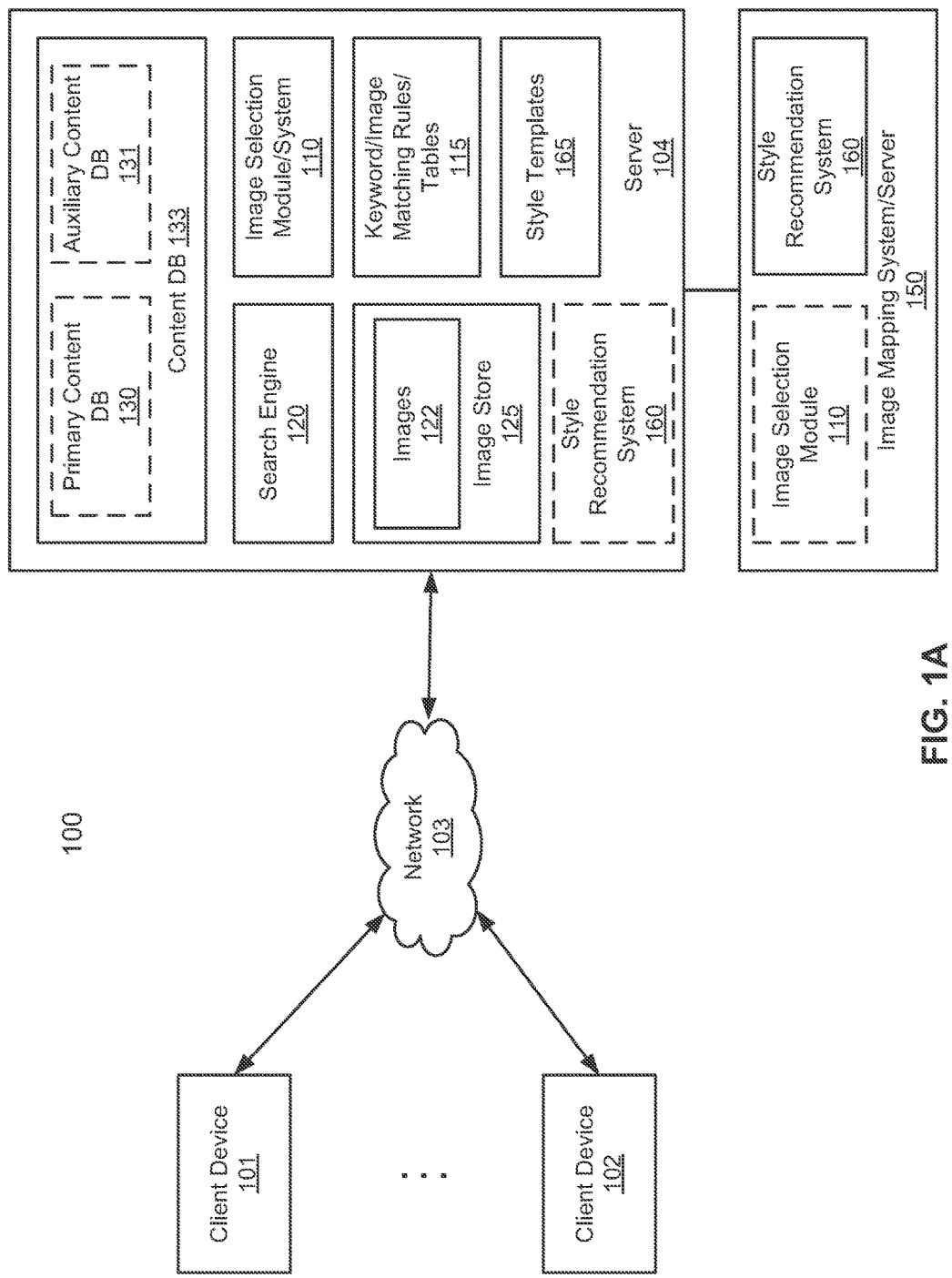
FIGS. 1A and 1B are block diagrams illustrating an example of system configuration for matching images with content items according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a content style determination or recommendation system is utilized to generate a list of content style candidates based on a variety of information, such as, for example, search queries, content items, images, as well as other metadata surrounding the circumstances. Each content style includes information describing a particular arrangement or layout between a content item and an image associated with the content item. Given a content item (e.g., a text description), the content style determination system determines a list of content style candidates and optional one or more images associated with the content item.

The images are identified by searching based on a set of keywords that are determined based on a search query that yielded the content item, one or more keywords associated with a content provider that provides the content item, and/or one or more keywords extracted from the content item. The images are ranked and sorted using a proper ranking algorithm. For each of the determined content style candidates, one of the images is selected and arranged with the content item according to a layout of the corresponding content style candidate. The list of content style candidates is then transmitted to a remote style selection system (e.g., a content provider system) to select one of the style candidates. The selected style (having the content item and the associated image therein) is then presented to a user of a client device or alternatively, stored in a content database for subsequently searching. The selected style may also be stored in an online searching system as a content style template for subsequent content and image online searching.

According to one embodiment, in response to a content description describing a content item, an analysis is performed on the content description. An image having image content is identified that is related to the content description based on the analysis. One or more phrases are derived from the content description based on the analysis, the one or more phrases summarizing the content description. A list of content styles is determined based on a relationship between the image and the one or more phrases. A composite content item having the image and the one or more phrases therein is generated based on a selected content style selected from the list of content styles. The image and the one or more phrases are arranged within the composite content item according to a layout corresponding to the selected content style.

Figure 1B:
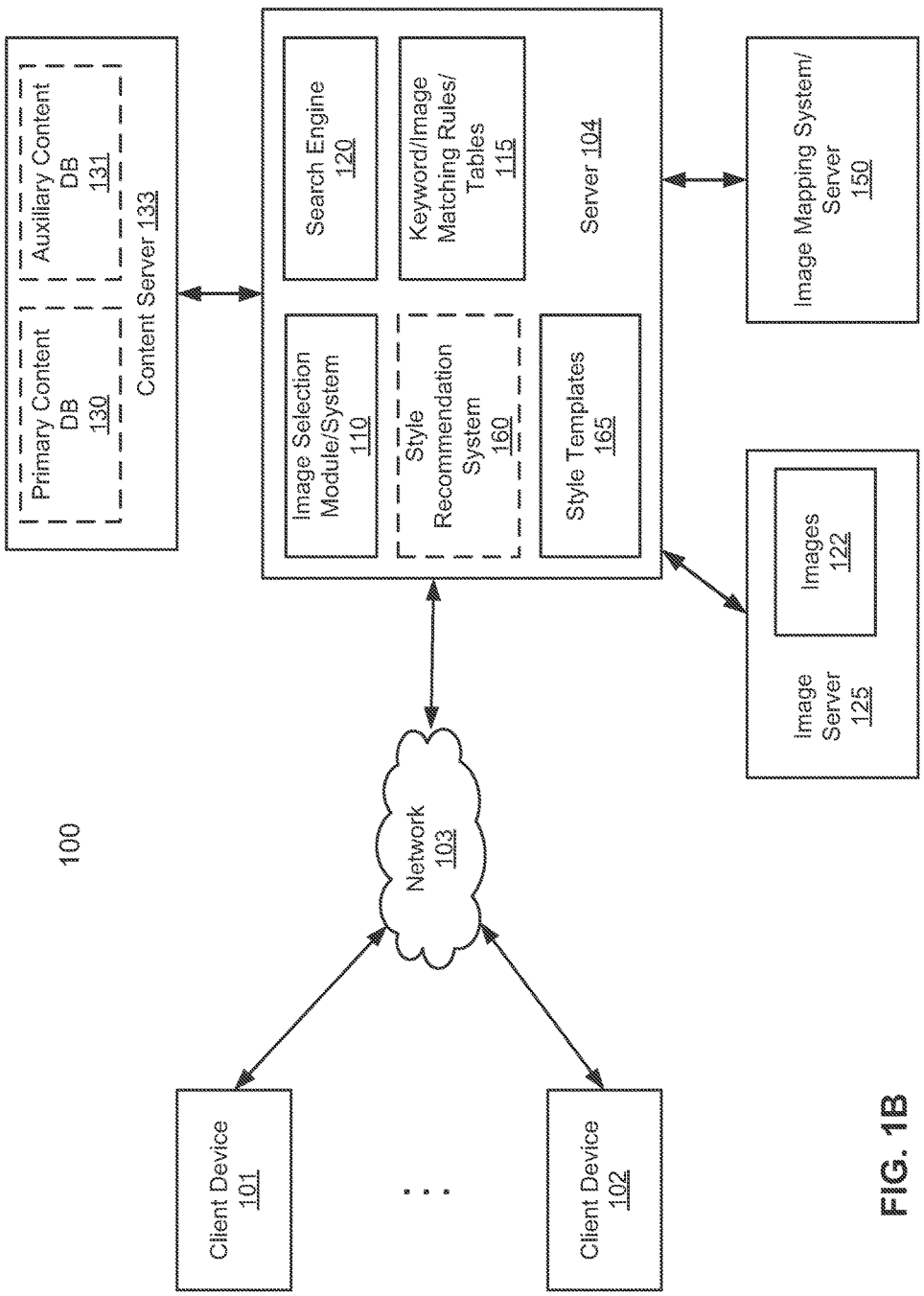

FIGS. 1A and 1B are block diagrams illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or a cluster of servers, such as Web or cloud servers, application servers, backend servers, or a combination thereof. In one embodiment, server 104 includes, but is not limited to, search engine 120, image selection module 110, and keyword/image matching rules 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a client application of client device 101 (e.g., Web browser, mobile application), may send a search query to server 104 and the search query is received by search engine 120 via an interface over network 103. The search query may be received via a variety of communication protocols such as a transport control protocol and Internet protocol (TCP/IP) protocol. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords.

Primary content database 130 (also referred to as a master content database) may be a general content database, while auxiliary content database 131 (also referred to as a secondary or accessory content database) may be a special or sponsored content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called a proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). Alternatively, some of the content items may be sponsored content items provided and sponsored by a variety of content providers as sponsors. In one embodiment, primary content database 130 stores general content items that have been collected by network crawlers (e.g., unsponsored content).

Auxiliary content database 131 stores specific, special, or sponsored content items (e.g., advertisements or Ads) that are associated with specific, known, or predetermined content providers (e.g., advertisers). In one embodiment, in response to a search query, a first set of keywords is determined based on the search query, where the keywords include search terms specified in the search query and keywords semantically related to the search terms. The first set of keywords are then matched with another set or sets of keywords (e.g., bidwords) associated with one or more content providers. If there is a match, a corresponding content item or items are identified and retrieved from auxiliary content database 131. There may be a query keyword to content provider keyword matching data structure or table (not shown) for matching purposes.

Keyword/image matching rules/tables 115 (also referred to as an image index) includes a number of mapping entries, each mapping entry mapping one or more keywords to one or more image IDs identifying one or more images. Keyword/image matching rules/tables 115 may be implemented in a variety of data structures such as a table or database. Based on the image IDs, a list of image candidates can be identified and retrieved from images 122 stored in image store 125, where image store 125 may also store image metadata (not shown) describing images 122. In one embodiment, images 122 and their respective metadata may be obtained by one or more image or network crawlers that are designed to craw the networks to collect images as well as their surrounding metadata. Images 122 may be non-privileged, non-copyrightable, properly licensed images, or any other authorized images.

According to one embodiment, keyword/image mapping rules 115 may be previously compiled and generated prior to receiving the search query (e.g., offline). The set of keyword/image matching rules 115 is configured to map one or more keywords to one or more image IDs identifying one or more images. The keywords may be identified as the keywords that are more likely be used in search queries, keywords associated with certain content items, and/or keywords associated with certain content providers. Such keywords may be identified based on an analysis or tracking of user searching activities or search history, which may be compiled for a period of time.

Subsequently when a search query is received online by search engine 120 from a client device for searching content, a search is performed in content database 133 to retrieve a list of content items. In addition, for at least one of the content items, an analysis is performed, for example, by image selection module 110, on the search query, the content item, and/or a content provider providing the content item, to determine a set of keywords. The keywords may include one or more keywords associated with the search query (e.g., search terms), one or more keywords associated with the content item (e.g., obtained from a title and/or description of the content item), and/or one or more keywords (e.g., bidwords) associated with the content provider providing the content item. The keywords may further include certain keywords that are semantically similar or have the same meaning of the original keywords (e.g., synonymous words or phrases). Based on the keywords, a list of one or more images are identified from image store 125 using the set of keyword/image matching rules 115.

According to one embodiment, the identified images may be ranked by image selection module 110, using a variety of ranking algorithms or ranking models, which have been generated and configured by image mapping system 150. For at least one of the content items found in content database 133, an image is selected from the list of image candidates to be associated with the content item. The selected image may be incorporated with the content item to generate an incorporated or composite content item. For example, the selected image may serve as a background image to the content item or alternatively, the selected image may be positioned complementing or alongside the content item. The list of incorporated content items and images is returned to client device 101 as part of a search result.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server. Image mapping system 150 may also be implemented as a separate server, which is responsible for creating keyword/image mapping rules or tables 115 based on the content items and their respective associated keywords of content database or server 133.

Other architectures or configurations may also be applicable. For example, as shown in FIG. 1B, content database 133 may be maintained and hosted in a separate server as a content server over a network. Similarly, image store 125 may be maintained and hosted in a separate server as an image server having an image searching engine therein. Servers 133 and 125 may be Web servers, application servers, or backend servers. Content server 133 and/or image server 125 may be organized and provided by the same entity or organization as of server 104. Alternatively, content server 133 and/or image server 125 may be maintained or hosted by separate entities or organizations (e.g., third-party providers), which are responsible for collecting contents in content databases 130-131 and images 122 and their metadata.

Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary or accessory content server. The content items obtained from both content databases 130-131 may be matched with images obtained from image store/server 125 using a variety of matching formulas. Alternatively, only content items obtained from one of primary content database 130 and auxiliary content database 131 will be matched with images obtained from image store/server 125. For example, content items obtained from auxiliary content database 131 (e.g., sponsored content) may be matched with the images obtained from image store/server 125, while content items obtained from primary content database 130 (e.g., general content) may be returned to the client device without modification as part of the search result.

According to one embodiment, when a content item and an image are incorporated into a composite content item, the content item and the image may be arranged or positioned within the composite content item according to a content style The content style may be selected from a list of content styles that are determined related to the content item, a content provider providing the content item, the image and its image metadata, and/or the search query. The content styles may be represented by content style templates 165, which may be utilized at real-time. A content style refers to a set of style metadata specifying how a content item and an image should be positioned and arranged within a composite content item, including a relative positions of the content item and image, the sizes of the content item and/or the image, the color of the content item, etc.

According to one embodiment, image mapping system 150 includes a content style recommendation system 160 to generate (e.g., offline) a list of content styles and recommend at least some of the content styles to be utilized to match content items and images. Image mapping system 150 may further provide a list of content style templates such as style templates 165 to be utilized by server 104 (e.g., online). Alternatively, for a particular content item provided by a content provider, style recommendation system 160 may identify a proper content style and an appropriate image, and render a composite content item according to the identified content style. The composite content item is then stored in a content database such as auxiliary content database 131.

As a result, the composite content item can be directly identified and retrieved from the content database online without rendering.

Figure 2:
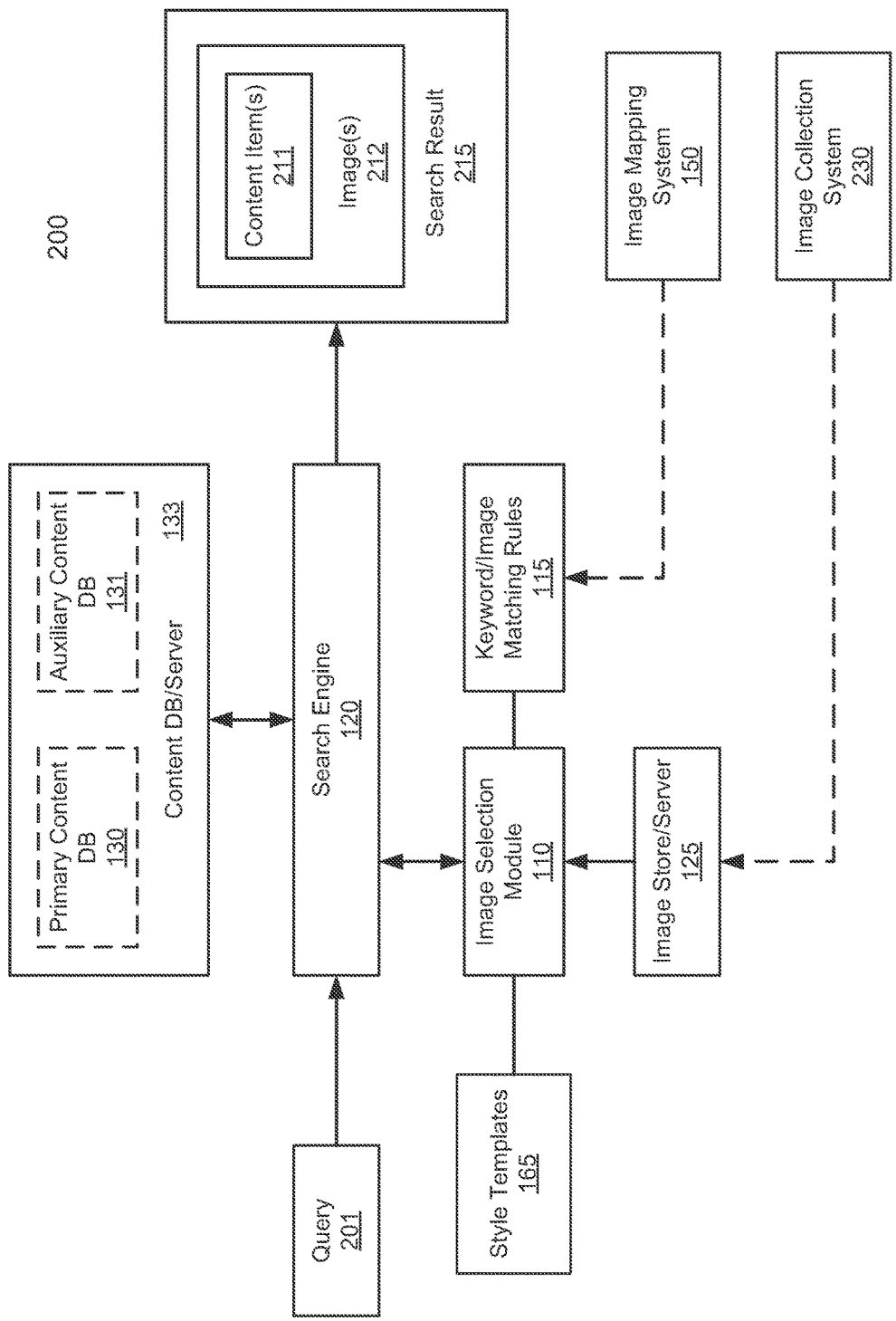
FIG. 2 is a block diagram illustrating an example of an image selection system according to one embodiment of the invention.

FIG. 2 is a block diagram illustrating a system for matching images with content items according to one embodiment of the invention. System 200 may be implemented as part of system 100 of FIGS. 1A-1B. Referring to FIG. 2, when search query 201 is received from a client device (e.g., client device 101 of FIG. 1), search engine 120 performs a first search in content database or content server 133 to identify and retrieve a first list of content items based on one or more keywords or search terms associated with search query 201. In addition, for at least one of the content items, search engine 120 communicates with image selection module 110 to identify a list of images from image store or image sever 125 based on the keywords associated with search query 201 and/or the content item and its content provider using a set of keyword/image matching rules 115. Search engine 120 and/or image selection module 110 may perform an analysis on the search query and the content item/content provider to derive a list of keywords. The searches performed in content database/server 133 and/or image store/server 125 may be performed on the list of expanded keywords expanded from the original keywords based on an analysis (e.g., a latent semantic analysis).

In one embodiment, image selection module 110 and/or keyword/image matching rules 115 may be integrated with search engine 120. Keyword/image matching rules 115 may be previously configured or compiled, for example, by image mapping system 150 as a data analytics system. Image mapping system 150 may be hosted in a separate system or server communicatively coupled to system 200 via an API or over a network. Image mapping system 200 may include a user interface to allow a user or an administrator to configure a set of keyword/image matching rules, which may then be expanded and ranked using a predetermined algorithm by processing logic.

Similarly, images stored in image store/server 125 may be collected by image collection system 230, which may be a separate system or server communicatively coupled to system 200 over a network. Image mapping system 150 and/or image collection system 230 may be operated by the same or different entity or organization as of system 200. In this example, images may be cached and stored in a local image store with respect to system 200 (e.g., local to server 104). Alternatively, images may be maintained by a designated server associated with image collection system 230, with which image selection module 110 communicates to identify and retrieve the list of images via API.

Based on the list of images retrieved from image store/server 125, image selection module 110 ranks the images according to a ranking algorithm. Some of the images are then matched with some of the content items identified and retrieved from content database/server 133. The matched content items and images are then integrated into integrated content items. In one embodiment, an image may be selected as a background image or a complementary image to a content item. For example, content item 211 may be a description or text and image 212 may be selected to be a background image for content item 211. Image 212 is selected based on the matching techniques described throughout this application to complement or describe content item 211, or vice versa, in an appropriate manner. For example, the content of content item 211 is related to the content as shown in image 212, or vice versa. The integrated images 212 and content items 211 may be returned to the client device as a part of search result 215.

According to one embodiment, when a content item and an image are incorporated into a composite content item, the content item and the image may be arranged or positioned within the composite content item according to a content style The content style may be selected from a list of content styles that are determined related to the content item, a content provider providing the content item, the image and its image metadata, and/or the search query. The content styles may be represented by content style templates 165, which may be utilized at real-time. A content style refers to a set of style metadata specifying how a content item and an image should be positioned and arranged within a composite content item, including a relative positions of the content item and image, the sizes of the content item and/or the image, the color of the content item, etc.

According to one embodiment, image mapping system 150 includes a content style recommendation system 160 to generate (e.g., offline) a list of content styles and recommend at least some of the content styles to be utilized to match content items and images. Image mapping system 150 may further provide a list of content style templates such as style templates 165 to be utilized by server 104 (e.g., online). Alternatively, for a particular content item provided by a content provider, style recommendation system 160 may identify a proper content style and an appropriate image, and render a composite content item according to the identified content style. The composite content item is then stored in a content database such as auxiliary content database 131. As a result, the composite content item can be directly identified and retrieved from the content database online without rendering. Note that some or all of the components or modules as shown in FIG. 2 may be implemented in software, hardware, or a combination thereof.

FIG. 3 is an example of keyword-image matching tables according to one embodiment of the invention. Referring to FIG. 3, keyword/image matching table 300 may represent keyword/image matching rules 115 of FIGS. 1A-1B and 2 as described above. In one embodiment, keyword/image matching table 300 includes a number of matching entries. Each of the matching entry maps one or more keywords 301 to one or more image IDs 302, where image IDs 302 identify the corresponding images in an image store or image server, such as image store/sever 125. Matching table 300 is indexed based on the keywords. In this example, a first entry maps a term "flower" to images 1-5. A second entry maps a term "Beijing flower" to image 1 only. A third entry maps a term "Shanghai flow" to image 2. A fourth entry maps a term "flower delivery" to images 1-2 and 4. Thus, if a search query contains "Beijing flower," images 1-5 may be identified. However, image 1 may have a higher ranking.

Figure 4:
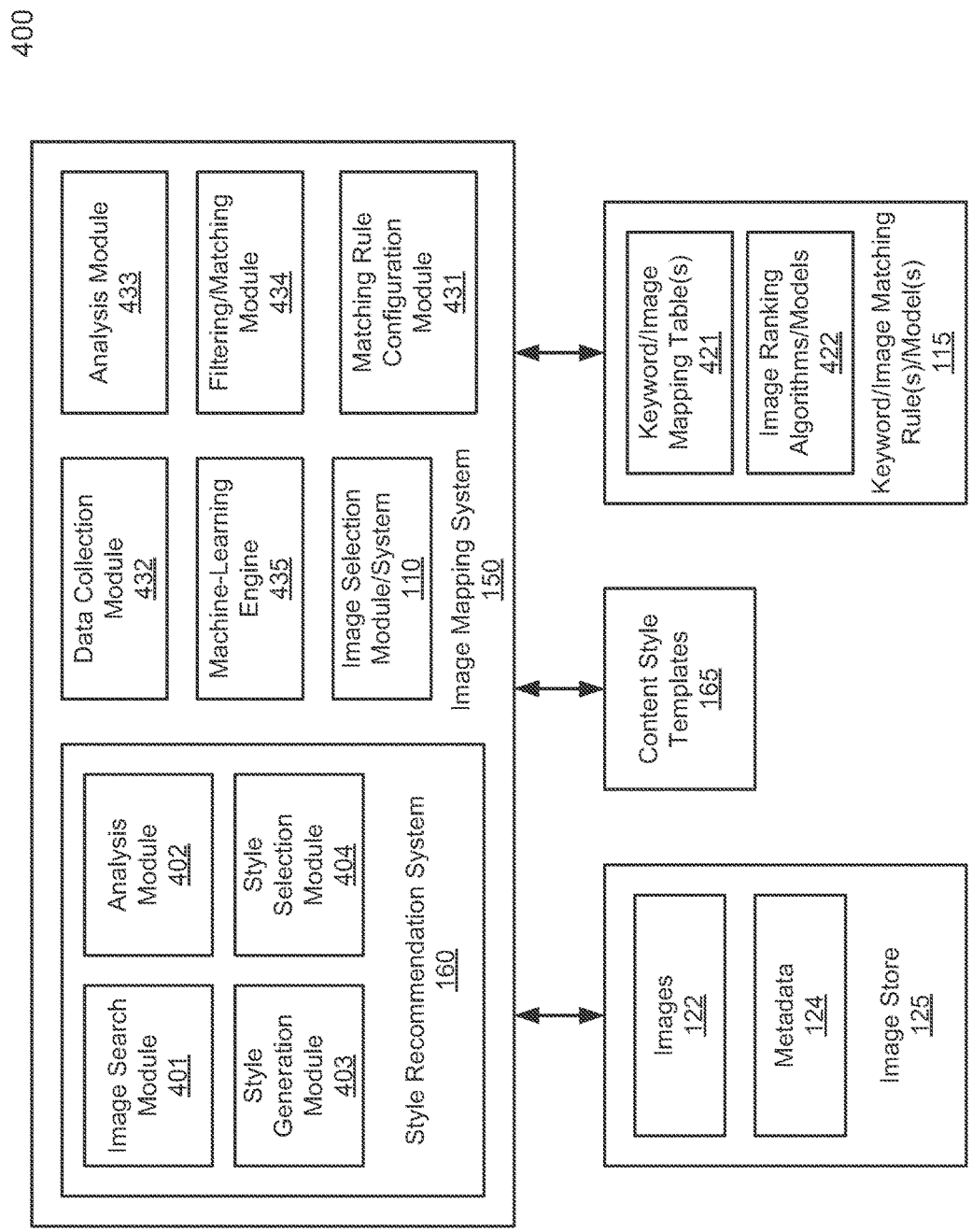
FIG. 4 is a block diagram illustrating an image mapping system according to one embodiment of the invention.

FIG. 4 is a block diagram illustrating an image mapping system according to one embodiment of the invention. System 400 may be implemented as part of system or sever 150 of FIGS. 1A-1B. Referring to FIG. 4, system 400 includes, but is not limited to, keyword/image mapping system 150, image store 125, and keyword/image matching rules 115. In one embodiment, system 400 is utilized to configure and generate a set of keyword/image matching rules 115 to map certain keywords to images stored in image store 125.

Image store 125 may be maintained locally or remotely in a designated server over a network. The keywords utilized in mapping in query/image matching rules 115 may be the keywords that are more likely used in search queries. Image store 125 stores images 122 and their respective metadata 124. Keyword/image matching rules 115 include keyword/image mapping tables 421 and image ranking algorithms or models 422. Keyword/image mapping tables 421 may be implemented as any of mapping tables as shown in FIG. 3.

In one embodiment, image mapping system 150 includes matching rule configuration module 431, data collection module 432, analysis module 433, matching module 434, and machine-learning engine or training module 435. Modules 431-435 may be implemented in software, hardware, or a combination thereof. In one embodiment, configuration module 431 may be utilized to configure keyword/image mapping table 421, for example, in response to a user request via a user interface. Keyword/image mapping table 421 includes a number of mapping entries. Each mapping entry maps a keyword to one or more image IDs identifying one or more of images 122 stored in image store 125. Images 122 and metadata 124 may be periodically collected and updated by data collection module 432. Data collection module 432 may employ some Web crawlers to craw and collect the images and their surrounding information or metadata 124.

In one embodiment, metadata 124 includes a variety of information or data describing images 122, where metadata may be obtained or collected by a designated data collection module or system, such as data collection module 432. For example, image metadata may be collected at the time of a corresponding image is obtained. The image metadata may include a source from which the image is collected and a time of the collection. A source from which an image is obtained may be a Web page or a document in which the image is attached. An address such as a universal resource locator (URL) of the source page may be collected. In addition, an analysis may be performed on the content of the source page to determine the content possibly represented by the image. An image recognition may also be performed on the image to determine the content of the image (e.g., whether the image is about a person, an object, landscape, texts, or a combination thereof). In addition, attributes of the image, such as an aspect ratio, pixel counts, brightness, contrast, time of the image taken, and style (e.g., landscape vs. portrait, size of the image), may also be collected. Further, prior user interactions with the image and/or keyword in the past (e.g., a click through rate) may also be determined based on the history interactions associated with the image. These information may be compiled as part of metadata of the images 124, also referred to as features of the images for the purpose of scoring.

Based on the metadata, filtering and matching module 434 performs a filtering operation to determine whether a particular keyword sufficiently describing the image by matching the semantic meanings between the keyword and the metadata of a particular image. For example, if a keyword appears in a source page from which the image was collected, the keyword is related to the image. Similarly, if a keyword describes at least a portion of content of the image in response to an image recognition, the keyword may be related. If it is determined that a keyword does not sufficiently describes a particular image or vice versa based on the analysis on the metadata, that particular image may be removed. If it is determined that the prior user interactions with a particular image is below a predetermined threshold (e.g., fewer user interactions, less user interest or unpopular), that particular image may be removed from keyword/image mapping table 421. Note that throughout this application, the terms of "matching rule," "mapping rule," "matching table," and "mapping table" are interchangeable terms for the purposes of illustration. However, they can be implemented in a variety of data structures or formats.

In one embodiment, analysis module 433 perform an analysis on at least metadata 124 of images 122 to extract or obtain various image features associated with images 122 and their metadata 124. Based on the analysis, a set of feature scoring formulas or algorithms are determined based on the features of the images such as those listed above. For each of the features, a scoring formula or algorithm may be generated. In addition, a matching quality scoring formula or algorithm is also determined. Alternatively, the features and/or features scores may be trained or learned by machine learning engine 435 to create a ranking model to determine a ranking score for a particular image. These algorithms and/or models can then be stored as part of image ranking algorithms/models 422, which can be utilized online to rank the image candidates to be matched with a content item in response to a search query. The image candidates may be identified using keyword/image mapping table 421 in response to a search query.

Figure 7A:
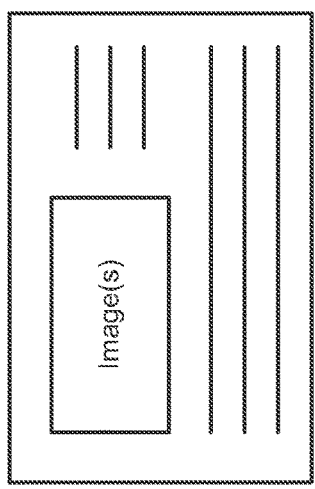
FIGS. 7A-7C show examples of content styles according to certain embodiments of the invention.
Figure 7B:
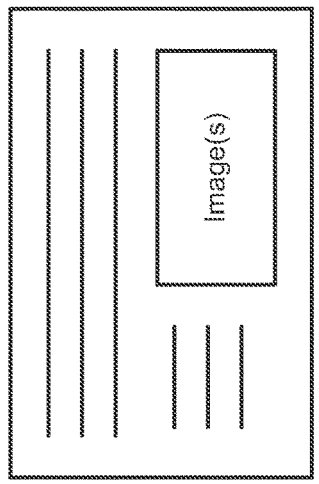
Figure 7C:
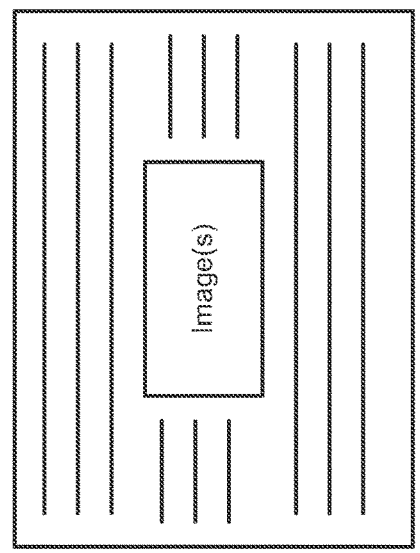

According to one embodiment, image mapping system 150 further includes content style recommendation system 160 (also referred to as a content style determination system) to determine and recommend a content style for rendering a composite content item based on a content item, a content provider of the content item, and/or an image to be matched with the content item. A content style refers to a set of style metadata specifying how a content item and an image should be positioned and arranged within a composite content item, including a relative positions of the content item and image, the sizes of the content item and/or the image, the color of the content item, etc., such as, for example, styles as shown in FIGS. 7A-7C.

In one embodiment, content style recommendation system 160 includes, but is not limited to, image search module 401, analysis module 402, style generation module 403, and style selection module 404. For a given content item to be matched with an image, image search module 401 searches for an image that is related to the content item. Analysis module 402 performs an analysis on the content item to obtain one or more phrases or sentences summarizing or describing the content item. Style generation module 403 generates a set of style candidates, each style candidate having style metadata describing a layout of the style. Style selection module 404 selects one of the content styles. A composite content item is then rendered based on the content item and the matched image according to a layout specified by the selected content item.

Figure 5:
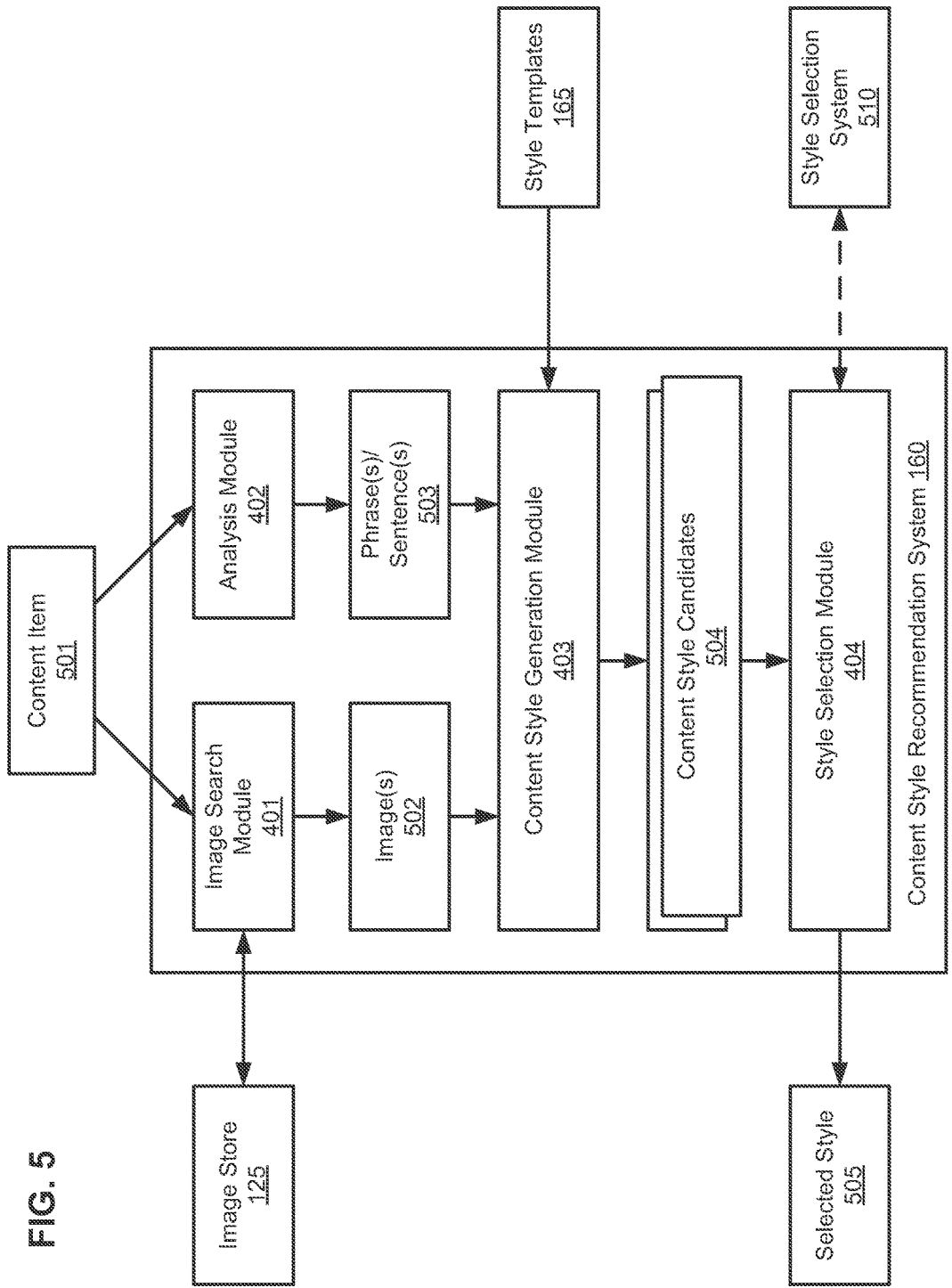
FIG. 5 is a processing flow of a content style recommendation process according to one embodiment of the invention.

FIG. 5 is a processing flow of a content style recommendation process according to one embodiment of the invention. Referring to FIG. 5, content item 501 is received to be matched with an image, where content item 501 is identified based on one or more keywords associated a content provider providing content item 501 (e.g., bidwords of an advertiser) or one or more keywords associated with a search query. In response to content item 501, image search module 401 performs a search in image store 125 to identify one or more images that are related to content item 501. In one embodiment, image search module 401 may invoke image selection module 110 to analyze, search, and rank a list of image candidates as described throughout this application. In addition, analysis module 402 performs an analysis (e.g., text analysis) on the content description of content item 501 to derive one or more phrases or sentences 503 that summarize and describe content item 501. Phrases/sentences 503 may be a subset of the content description associated with content item 501.

Based on one or more images 502 and one or more phrases/sentences 503, style generation module 504 generates a list of style candidates based on style templates 165. Each content style candidate contains at least one of images 502 and one or more phrases/sentences 503. Images 502 and phrases/sentences 503 may be arranged according to a style template corresponding to the content style candidate. Examples of the content style candidates are shown as composite content items in FIGS. 7A-7C, where an image and associated phrases/sentences (represented by lines) are positioned at different relative positions within each composite content item.

In one embodiment, style generation module 403 analyzes images 502 and phrases/sentences 503 to select one or more style templates from style templates 165. Style generation module 403 may mix and match different ones of images 502 and phrases/sentences 503 with the style templates according to a set of style matching rules (not shown). A style template of a content style includes style metadata specifying how a phrase/sentence and an image should be positioned and arranged within a composite content item, including a relative positions of the phrase/sentence and image, the sizes of the phrase/sentence and/or the image, the color of the phrase/sentence, etc.

For example, in promoting bottle water, there may be a health aspect and a convenience aspect. The health aspect refers to a perception that drinking water is healthy in general. The convenience aspect refers to a shape of the water bottle that is easier to hold by hand. If the main scheme is to promote the health aspect, it is more effective to use a phrase/sentence. On the other hand, if the main scheme is to promote the convenience aspect, an image showing a body shape of the bottle may be more effective. Accordingly, style generation module 403 may select a different style template dependent upon what is to be focused, the health aspect or the convenience aspect. If the focus is on an image, the image may be positioned at a location that is most appealing to a user such as the center of the composite content item. If the focus is on a phrase/sentence, the phrase/sentence may be positioned at a location that is most appealing to a user such as the center and with a larger size or a brighter color, etc.

In one embodiment, the style candidates (e.g., the composite content items) may be optionally transmitted to style selection system 510 to select one of the style candidates. Selected style 505 (i.e., selected composite content item) is then stored in a content database such as content database 133 of FIGS. 1A-1B for subsequent online content searching. In one embodiment, style selection system 510 may be associated with a content provider that provides content item 501. An administrator associated with the content provider may select one of the style candidates. The rationale behind it is that the content provider may be in a better position to determine which style is the best style for its content items under the circumstances. Style selection system 510 may replace some of the content (e.g., an image, a phrase, a word) within the selected composite content item.

In this embodiment, style generation module 403 renders a composite content item based on a selected image and a phrase/sentence according to a selected style template. The composite content item having the selected image and the phrase/sentence therein is then stored in a content database for subsequent searching. Most of the above processes are performed offline, for example, by image mapping system 150 as a data analytics system.

According to another embodiment, only a style template and/or style metadata of a selected content style are selected offline and stored in the online system as part server 104, while the content items and images will be determined at runtime. One of the advantages is that an image to be matched with a content item can be dynamically searched and identified at runtime, as the available images and/or content items may be constantly changed in real-time. However, the performance of the searching (e.g., speed) may be lowered. In this embodiment, online searching system (e.g., server 104) may maintaining a content item to content style mapping table. The content/style mapping table may include a number of mapping entries, each entry mapping a content ID identifying a content item to a content style ID identifying a content style. Alternatively each entry maps a content provider ID of a content provider to a content style ID. The content ID may further identify one or more phrases/sentences summarizing a content description of the corresponding content item. Thus, during online searching, when a content item is identified, an image will be searched and identified dynamically. The phrase/sentence corresponding to the content item and the image are then incorporated into composite content item according to a corresponding content style. The composite content item is then returned to a client.

Figure 6:
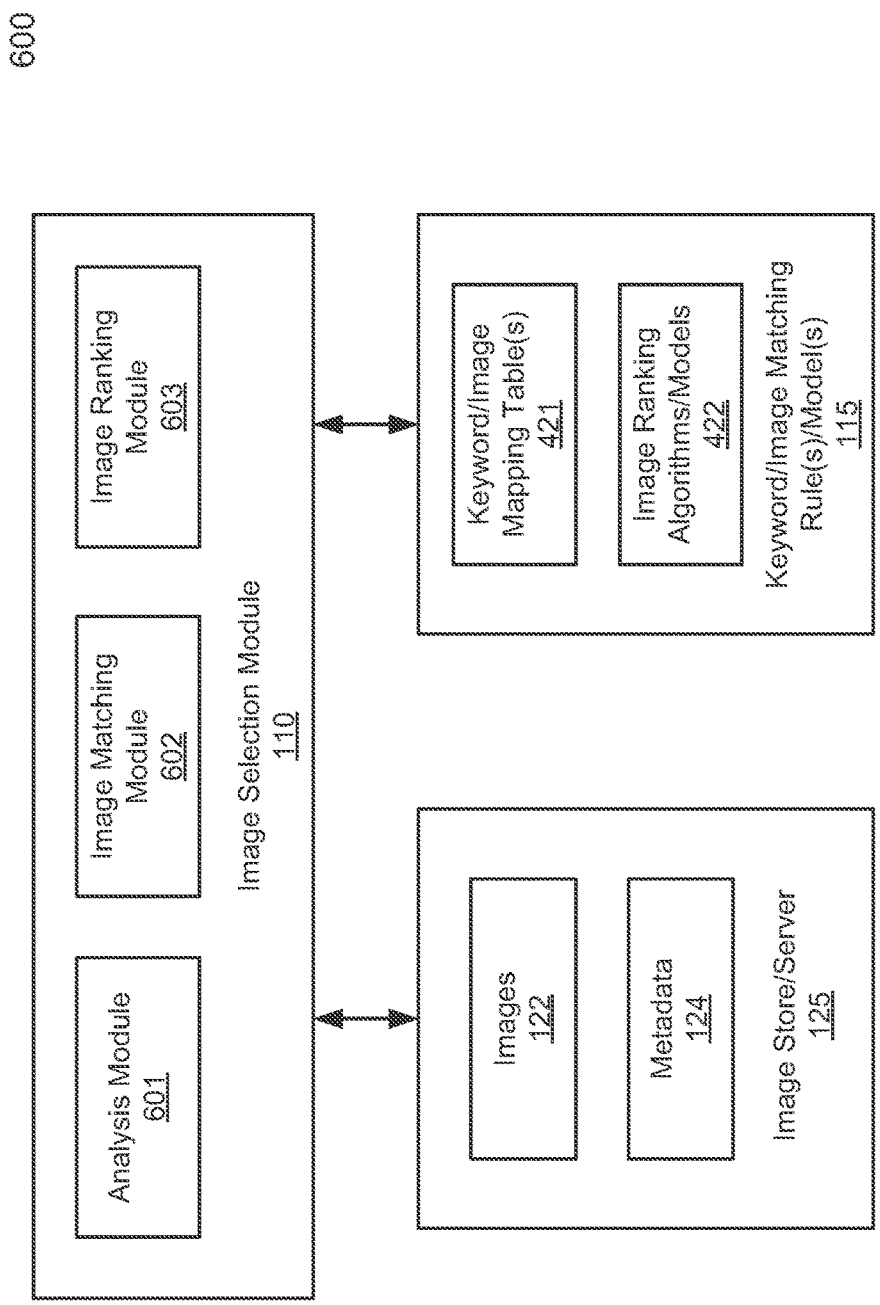
FIG. 6 is a block diagram illustrating an example of an image matching system according to one embodiment of the invention.

FIG. 6 is a block diagram illustrating an example of an image matching system according to one embodiment of the invention. System 600 may be implemented as part of system 200 of FIG. 2. Referring to FIG. 6, system 600 may be incorporated with system 200 of FIG. 2. Alternatively, system 600 may be implemented as a standalone system or a server communicatively coupled to system 200 of FIG. 2, for example, via an API or a communication protocol over a network or a connection. In one embodiment, system 600 is responsible for identifying, ranking, and selecting images to be matched with content items found in response to a search query at runtime, in response to a search query for searching content.

In one embodiment, image selection module 110 includes analysis module 601, image matching module 602, and image ranking module 603, where some or all of these modules may be implemented in software, hardware, or a combination thereof. In one embodiment, in response to a search query received from a client device for searching content, the search query is analyzed by analysis module 601 to determine one or more keywords. For a given content item to be matched with an image, analysis module 601 also analyzes the content and the associated content provider to generate additional keywords. Analysis module 601 may extract one or more keywords from the content item summarizing or describing the content item. Analysis module 601 may determine one or more keywords representing or describing the content provider (e.g., logo). Analysis module 601 may further perform a latent semantic analysis on the keywords to expand the keywords to include one or more keywords that are semantically related.

A search or lookup operation is performed by image matching module 602 in keyword/image mapping table 421 based on the keywords. The keyword/image mapping table 421 includes multiple entries and each entry maps an image ID identifying an image to one or more keywords, or vice versa (e.g., matching table as shown in FIG. 3). For each of the images identified as image candidates, a ranking process is performed by image ranking module 603 to determine a ranking score for the image. The images may be ranked or sorted based on image ranking algorithms or models 422, which may be configured by system 400 of FIG. 4 as described above. The image and the content item are then rendered into a composite content item according to an associated content style template as described above. The composite content item is then returned to a client.

Figure 8:
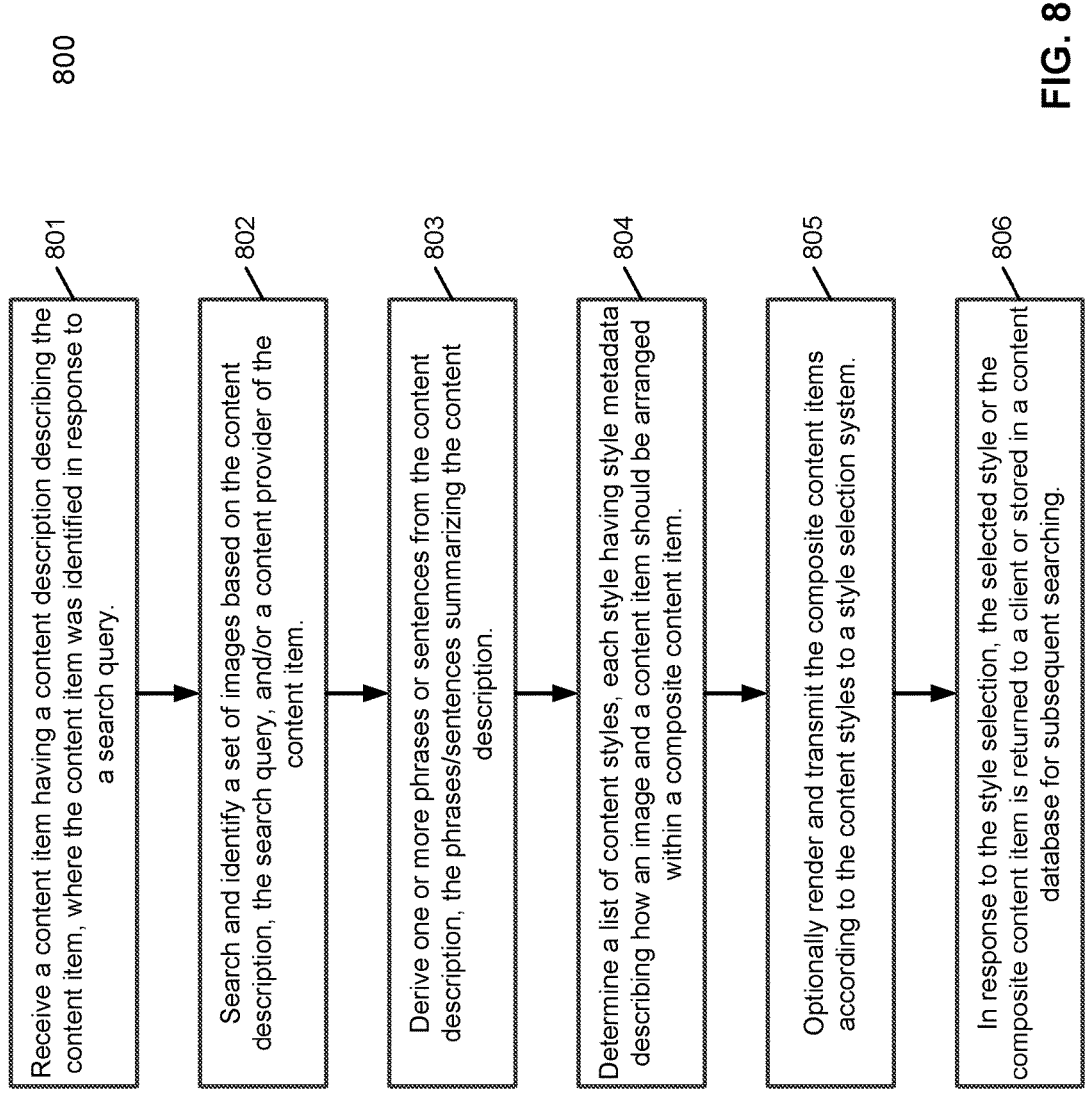
FIG. 8 is a flow diagram illustrating a process of generating a content style according to one embodiment of the invention.

FIG. 8 is a flow diagram illustrating a process of generating a content style according to one embodiment of the invention. Process 800 may be performed by software, hardware, or a combination thereof. For example, process 800 may be performed by system 400 of FIG. 4. Referring to FIG. 8, at block 801, processing logic receives a content item having a content description describing the content item. The content item was identified in response to a search query. At block 802, processing logic searches and identify a list of images based on the content item, the search query, and/or a content provider providing the content item. At block 803, processing logic derives one or more phrases or sentences from the content description. The phrases or sentences summarizes the content description of the content item.

At block 804, processing logic determines a list of content styles based on the images and the phrases/sentences. Each content style includes style metadata describing how an image and a phrase/sentence are to be arranged within a composite content item. At block 805, processing logic optionally renders a list of composite content items, each being rendered based on one of the images and the phrase/sentence according to one of the content styles. The composite content items representing the content styles may be transmitted to a remote style selection system. In response to a style selection, at block 806, the selected content style or the composite content item is transmitted to a client or stored in a content database for subsequent searching.

The techniques described above can be applied to matching images with sponsored content. One type of the sponsored content is advertisement (Ads). For example, referring back to FIGS. 1A-1B, content database (DB) or server 133 may be an Ads database or Ads server. Each of the content items, e.g., Ads, is associated with a list of predefined keywords, terms, phrases, or sentences. These predefined keywords, terms, phrases, or sentences may be bidwords purchased, defined or specified by an Ads provider. In another embodiment, primary content DB 130 may store the general content generally available in a public network. Auxiliary content DB 131 may be an Ads DB. Some of the Ads may be just plain texts. By matching and integrating an image with the Ads, for example, as a background image, the Ads may be more appealing or attractive to users. Server 104 may be a Web server for searching content or alternatively, server 104 may be an Ads server.

Figure 9:
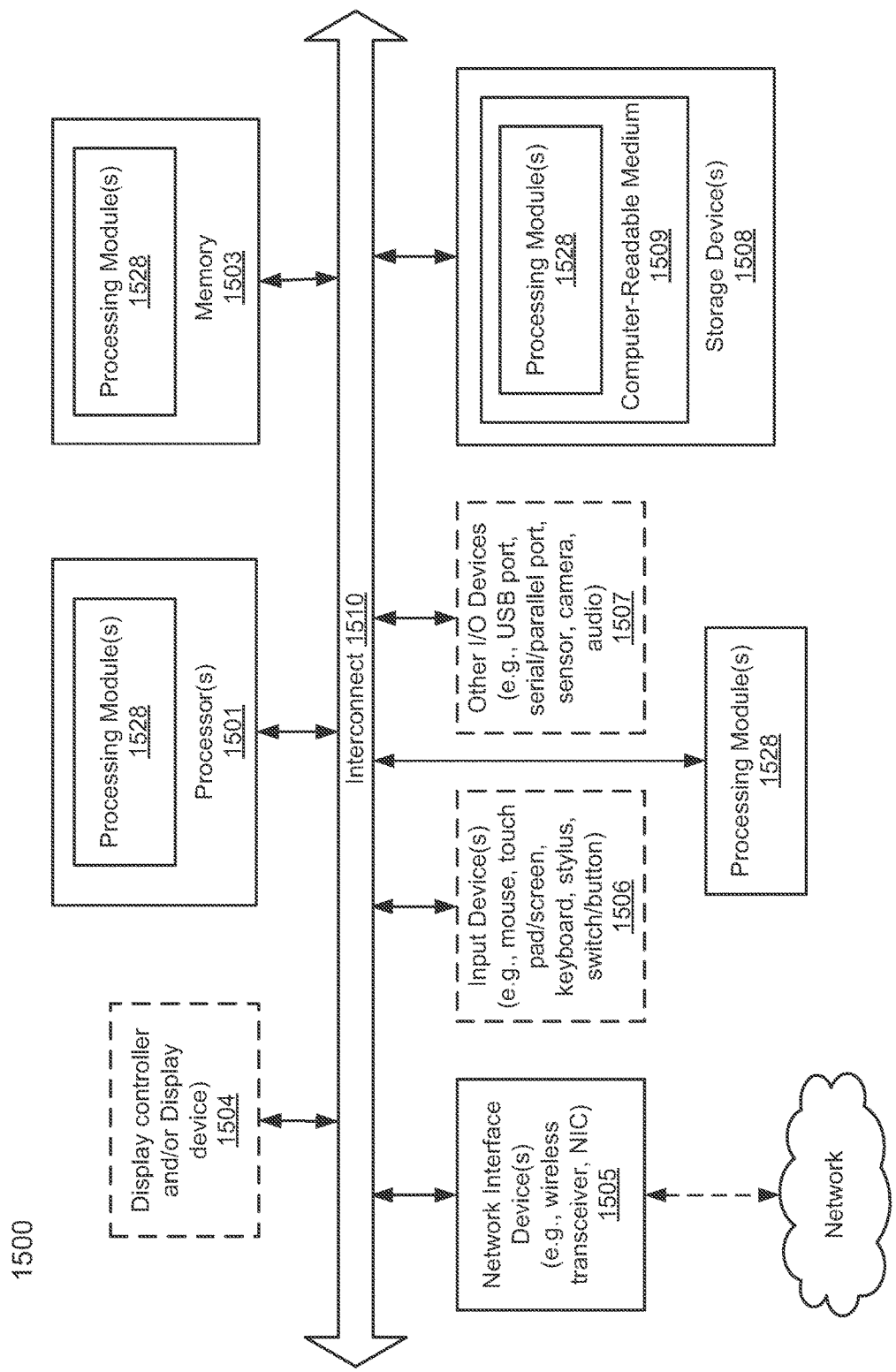
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above performing any of the processes or methods described above, such as, for example, a client device or a server described above, such as, for example, any of client devices 101-102, server 104, content server 133, or image mapping system/server 150 of FIGS. 1A-1B, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, a search engine, an image selection module/system, or a content style recommendation system, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/ logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/ logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining image-based content styles, the method comprising:
   in response to a content description describing a content item, performing an analysis on the content description;
   identifying an image having image content that is related to the content description based on the analysis;
   deriving one or more phrases from the content description based on the analysis, the one or more phrases summarizing the content description;
   determining a list of a plurality of content styles based on a relationship between the image and the one or more phrases, each of the plurality of content styles corresponding to a style template, each style template comprising style metadata specifying relative positions of the image and the one or more phrases within a composite content item;
   determining a selected content style from the list of content styles based on a content style selection received from a user, the selected content style corresponding to a first style template;
   storing the first style template; and
   generating a composite content item having the image and the one or more phrases therein based on the stored first style template, the image and the one or more phrases being arranged according to a layout corresponding to the first style template.

2. The method of claim 1, wherein identifying an image having image content that is related to the content description comprises:
   determining a set of one or more keywords based on the content description;
   searching in an image store to identify a list of a plurality of images based on the keywords; and
   ranking the list of images using a predetermined ranking algorithm to select the identified image.

3. The method of claim 2, wherein the set of keywords includes one or more of a title of the content description, a keyword extracted from the content description, and one or more predetermined keywords associated with the content item.

4. The method of claim 2, further comprising:
   assigning one of the images to each of the content styles;
   transmitting the list of content styles, each having an assigned image and the one or more phrases to a remote style selection system over a network; and
   receiving a selection of a content style from the remote style selection system for selecting the selected content style.

5. The method of claim 1, wherein each content style further includes information specifying a color and a size of the one or more phrases.

6. The method of claim 1, further comprising storing the composite content item in a content database, wherein the content database stores a plurality of composite content items to be used for subsequent content searching in response to a search query.

7. A non-transitory machine-readable medium having instructions stored therein, which when executed by a processor, cause the processor to perform operations of determining image-based content styles, the operations comprising:
   in response to a content description describing a content item, performing an analysis on the content description;
   identifying an image having image content that is related to the content description based on the analysis;
   deriving one or more phrases from the content description based on the analysis, the one or more phrases summarizing the content description;
   determining a list of a plurality of content styles based on a relationship between the image and the one or more phrases, each of the plurality of content styles corresponding to a style template, each style template comprising style metadata specifying relative positions of the image and the one or more phrases within a composite content item;
   determining a selected content style from the list of content styles based on a content style selection received from a user, the selected content style corresponding to a first style template;
   storing the first style template; and
   generating a composite content item having the image and the one or more phrases therein based on the stored first style template, the image and the one or more phrases being arranged according to a layout corresponding to the first style template.

8. The machine-readable medium of claim 7, wherein identifying an image having image content that is related to the content description comprises:
   determining a set of one or more keywords based on the content description;
   searching in an image store to identify a list of a plurality of images based on the keywords; and
   ranking the list of images using a predetermined ranking algorithm to select the identified image.

9. The machine-readable medium of claim 8, wherein the set of keywords includes one or more of a title of the content description, a keyword extracted from the content description, and one or more predetermined keywords associated with the content item.

10. The machine-readable medium of claim 8, wherein the operations further comprise:
    assigning one of the images to each of the content styles;

transmitting the list of content styles, each having an assigned image and the one or more phrases to a remote style selection system over a network; and receiving a selection of a content style from the remote style selection system for selecting the selected content style.

11. The machine-readable medium of claim 7, wherein each content style further includes information specifying a color and a size of the one or more phrases.

12. The machine-readable medium of claim 7, wherein the operations further comprise storing the composite content item in a content database, wherein the content database stores a plurality of composite content items to be used for subsequent content searching in response to a search query.

13. A data processing system, comprising:
a processor; and
a memory coupled to the processor to store instructions, which when executed by the processor, cause the processor to perform operations of determining image-based content styles, the operations including
in response to a content description describing a content item, performing an analysis on the content description,
identifying an image having image content that is related to the content description based on the analysis,
deriving one or more phrases from the content description based on the analysis, the one or more phrases summarizing the content description,
determining a list of a plurality of content styles based on a relationship between the image and the one or more phrases, each of the plurality of content styles corresponding to a style template, each style template comprising style metadata specifying relative positions of the image and the one or more phrases within a composite content item,
determining a selected content style from the list of content styles based on a content style selection received from a user, the selected content style corresponding to a first style template;
storing the first style template; and
generating a composite content item having the image and the one or more phrases therein based on the stored first style template, the image and the one or more phrases being arranged according to a layout corresponding to the first style template.

14. The system of claim 13, wherein identifying an image having image content that is related to the content description comprises:
determining a set of one or more keywords based on the content description;
searching in an image store to identify a list of a plurality of images based on the keywords; and
ranking the list of images using a predetermined ranking algorithm to select the identified image.

15. The system of claim 14, wherein the set of keywords includes one or more of a title of the content description, a keyword extracted from the content description, and one or more predetermined keywords associated with the content item.

16. The system of claim 14, wherein the operations further comprise:
assigning one of the images to each of the content styles;
transmitting the list of content styles, each having an assigned image and the one or more phrases to a remote style selection system over a network; and
receiving a selection of a content style from the remote style selection system for selecting the selected content style.

17. The system of claim 13, wherein each content style further includes information specifying a color and a size of the one or more phrases.

18. The system of claim 13, wherein the operations further comprise storing the composite content item in a content database, wherein the content database stores a plurality of composite content items to be used for subsequent content searching in response to a search query.

* * * * *